United States Patent [19]

Watanabe

[11] Patent Number: 4,924,659
[45] Date of Patent: May 15, 1990

[54] SEALING HEIGHT ADJUSTING DEVICE FOR PACKAGE WRAPPING APPARATUS

[75] Inventor: Harumi Watanabe, Urawa, Japan

[73] Assignee: International Sankoh Kabushiki Kaisha, Omiya Saitama, Japan

[21] Appl. No.: 221,327

[22] Filed: Jul. 19, 1988

[51] Int. Cl.$^5$ .................. B65B 9/06; B65B 51/30
[52] U.S. Cl. ................................ 53/550; 53/555
[58] Field of Search ............... 53/550, 450, 555, 373, 53/552, 568, 562, 548

[56] References Cited

U.S. PATENT DOCUMENTS

| | | | |
|---|---|---|---|
| 3,494,096 | 2/1970 | Suzuki | 53/550 X |
| 3,665,673 | 5/1972 | Billett et al. | 53/555 X |
| 4,185,443 | 1/1980 | Budzyn | 53/550 |
| 4,219,988 | 9/1980 | Shanklin et al. | 53/373 X |
| 4,494,362 | 1/1985 | Koch | 53/550 |
| 4,658,569 | 4/1987 | Hanagata | 53/550 |

*Primary Examiner*—Horace M. Culver
*Attorney, Agent, or Firm*—Emmanuel J. Lobato; Robert E. Burns

[57] ABSTRACT

A film wrapping apparatus for wrapping articles and a method of wrapping articles in a heat-sealable thermoplastic packaging film. The apparatus has a film-hauling device in form of a conveyer having travelling clamping runs of upper and lower belts for clamping a free marginal selvage or edge part of a folded strip of packaging film having the parts thereof superposed. An infeed device positions articles successively at a position in which the superposed parts of successive lengths of the folded film are hauled over and under the articles respectively and envelope the articles as the successive lengths of the folded film are advanced intermittently by the film-hauling device from a web. The folded film successive lengths move longitudinally through a heat-sealing device having heat sealing jaws that have an L-shaped heat sealing element for sealing leading and trailing ends of the successive lengths of folded film as well as the open sides of each length to form individual packages containing therein respective packaged articles. The heat-sealing device jaws and the film-hauling device can be adjusted as to their height to handle different height articles being packaged. The heat-sealing device is raised and lowered manually in accordance with the level of travel of the advancing film and the height of the articles being packaged.

5 Claims, 8 Drawing Sheets

SEALING HEIGHT ADJUSTING DEVICE FOR PACKAGE WRAPPING APPARATUS

BACKGROUND OF THE INVENTION

In an automatic package wrapping apparatus, disclosed in the Shanklin U.S. Pat. No. 358,388 and 4,219,988, an infeed conveyor and a discharge conveyor and disclose level with each other to allow smooth transportation of products, and a cross member of a sealing device is positioned between the infeed conveyor and the discharge conveyor when sealing products.

Since this sealing section is fixed on a main frame on the automatic packaging apparatus in the Shanklin U.S. Pat. No. 358,388, this sealing section can not be adjusted in height. Accordingly there is a defect with respect to the seal on the line of products which is varied according to the various heights of products to be wrapped.

This problem can be resolved by adjusting the height of the discharge conveyor, however if the height of the discharge conveyor is adjusted according to the height of the products being packaged, smooth transportation can not be performed because the level of the discharge conveyor and the infeed conveyor become different from each other.

The object of the present invention is to provide a sealing height adjusting device for a package wrapping apparatus which can keep the sealing line of products constant height (for example in the middle of the products' height) by adjusting the height of the sealing section according to the products' height.

DETAILED DESCRIPTION OF PREFERRED EMBODIMENT

Figure 1:
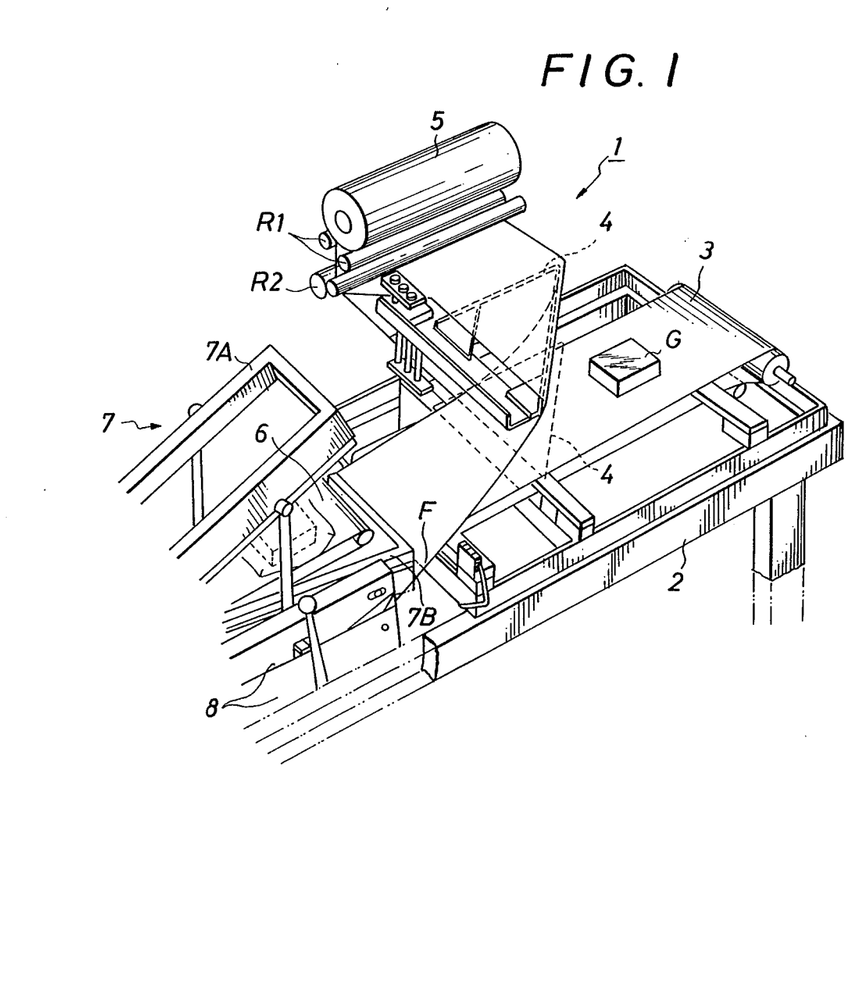
FIG. 1 is a perspective view showing a portion of a preferred embodiment of the package wrapping apparatus of the present invention.

FIG. 1 is a perspective view of a package wrapping apparatus without a sealing height adjusting device for ease of description. This package wrapping apparatus 1, as shown in FIG. 1, is provided with a discharge conveyor 3 in front of the frame of the apparatus.

An upper and a lower film inverting head 4, 4, in the shape of triangle frames are fixed on the cross members 4A, 4B respectively, and the height of the film inverting heads 4, 4 can be adjusted.

This film inverting heads 4, 4 are composed of the same compositions as what are used in Shanklin U.S. Pat. No. 358,388 and 4,219,988.

That is, a rolled film is placed on a pair of guide rollers R1, R1 which are located in parallel to the longitudinal direction of the infeed conveyor 3, and folded film is unwound in the lower direction through the guide rollers R1, R1.

The folded film is taken out in the longitudinal direction of the infeed conveyor 3 through guide rollers R2, R2 and through the clearance between the film inverting head 4, 4, and two edges of inverted folded film are matched between the discharge conveyor 6 and the infeed conveyor 3.

Discharge conveyor 6 is provided so that it extends in the same height and the same longitudinal direction as the infeed conveyor 3.

A film pulling device 8 is provided on the other side of the discharge conveyor 6 to hold and pull a selvage of a folded film in the direction of the path of travel of products after sealing.

A sealing section 7 is provided which seals packaging film for products by closing the upper sealing jaw 7A and the lower sealing jaw 7B.

This sealing section 7 comprising an upper sealing jaw 7A and a lower sealing jaw 7B of which one end is hinged to each other to allow the opening and the closing of the other end of the sealing jaws by long linkage 14A and short linkage 14B.

Figure 4:
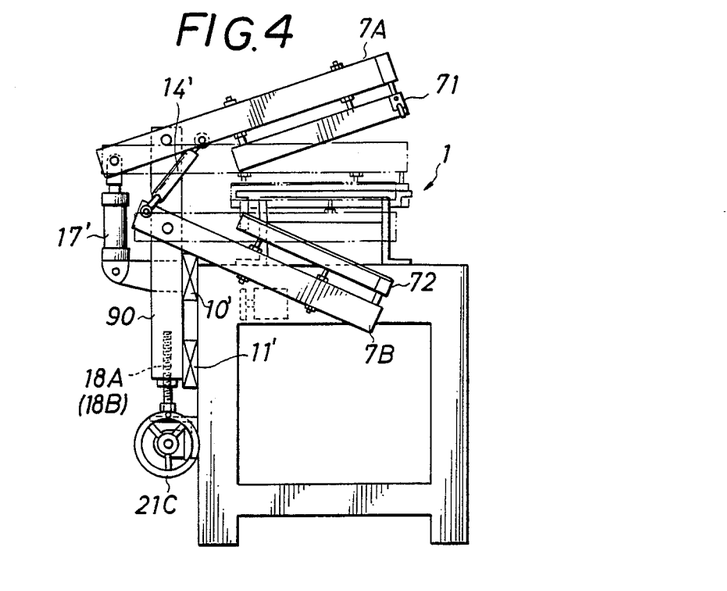
FIG. 4 is a side view corresponding to FIG. 3.

At the other end of the upper sealing jaw 7A an L-shaped heating knife 71 enclosing a heater in it is installed, and an L-shaped rubber pad 72 is installed at the end of the lower sealing jaw 7B in correspondence with the above l-shaped heating knife 71 (see FIG. 4).

A cross member 72' of the sealing section 7 is positioned between the infeed conveyor 3 and the discharge conveyor 6 when sealing products.

Lower ends of side plates 9A, 9B are installed on a base plate 9C through linear ball bearings 10, 10 secured on the main frame 2.

One end of each of long linkage 14A and short linkage 14B are pivotally mounted on the side of upper sealing jaw 7A, and the other end of them are also pivotally mounted on the both ends of a link lever 15 respectively.

The center of the lever 15 is pivotally mounted on a pivot axis secured on the center of the side plate 9B.

One end of a link 16 is secured in the center of the link lever 15 at some angles, and the other end of the link 16 is linked with the rod of an air cylinder 17 of which a head end is pivotally mounted on the base plate 9C which supports side plates 9A and 9B.

Accordingly when the air cylinder 17 is actuated, the link lever 15 rotates around a pivot axis p2, and the side plates 14A and 14B allow the sealing jaws 7A and 7B to be opened or closed in correspondence with a sealing position or a waiting position.

Figure 2:
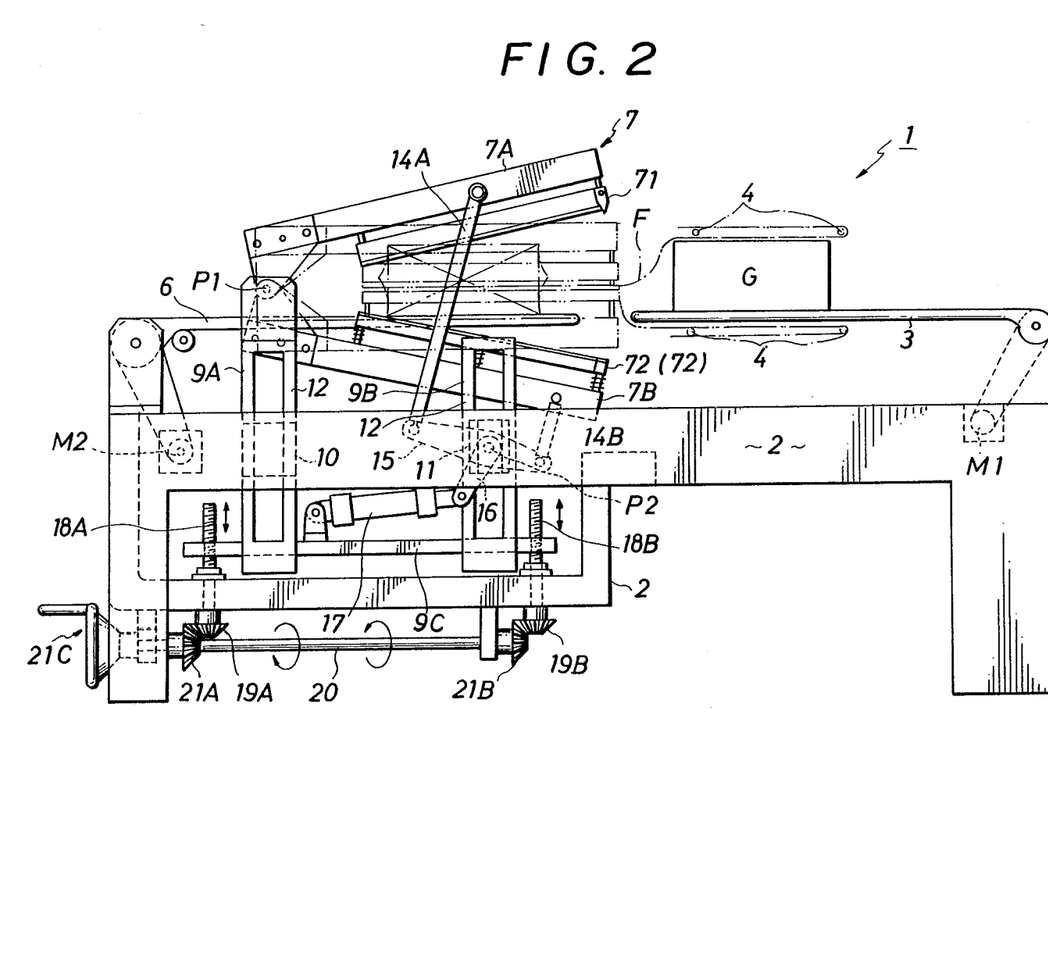
FIG. 2 is a side view of the apparatus in FIG. 1.

The sealing position is a closed position of the sealing jaws as shown in phantom line, of FIG. 2.

The waiting position is an opened position of sealing jaws as shown in a actual line of FIG. 2.

This sealing device 7 is installed on the main frame 2 as shown in FIG. 2.

The upper sealing jaw 7A and the lower sealing jaw 7B are pivoted together on the horizontal shaft p1 at one end.

And a pair of side plates 9A, 9A to hold the above shaft p1 are slidably mounted a vertical direction on the both sides of the main frame 2.

Also a pair of side plates 9A, 9B are slidably mounted in a vertical direction on both sides of the main frame 2.

On both sides of the main frame 2 four linear ball bearings hauling balls B are fixed to mate with each rail 12A, 12B of the side plates 9A, 9B for supporting the sealing section 7.

Sealing section 7 comprises an upper sealing jaw 7A provided with heated means and an lower sealing jaw 7B provided with a rubber pad.

These two jaws are pivotally mounted together at the shaft p1 which is supported with a pair of side plates 9A.

On the free end of the both sides of the upper sealing jaw 7A and the lower sealing jaw 7B, the long linkage 14A and the short linkage 14B are pivotally mounted respectively.

Four threaded holes are provided at the four corners of the rectangular base plate 9C, and four jack screws 18 each equipped with a bevel gear 19 on their bottom ends are vertically screwed into those threaded holes to be supported on the bearing of main frame 2.

And those bevel gears are meshed with the other bevel gears installed on the end and the middle of bevel gear shaft 20 mounted pivotally and horizontally on the lower portion of the main frame 2.

On the other end of the bevel gear shaft 20 a handle 21C is installed through the front surface of the main frame 2.

This bevel gear shaft 20 is rotated manually by the handle 21C in this embodiment, but it may be rotated automatically by means of an electric motor etc.

When bevel gear shaft 20 is rotated the jack screws 18A are rotated through bevel gears 19A, 19B meshing with the bevel gears 21A, 21B.

Accordingly the base plate 9C is elevated or lowered by turning the handle 21C.

As stated above the side plates 9A, 9B support the sealing section 7 and the air cylinder 17 for controlling the opening and the closing of the sealing section 7 are installed on the base plate 9C, so the sealing section 7 is elevated or lowered as the base plate is raised or lowered.

Figure 10A:
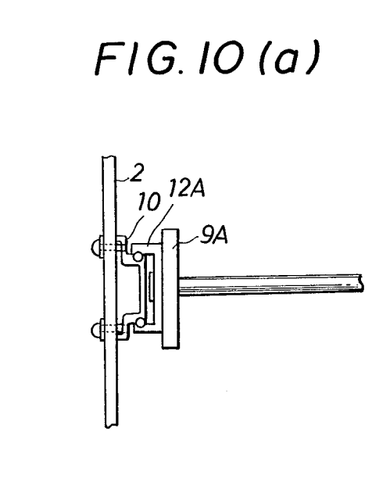
Figure 10B:
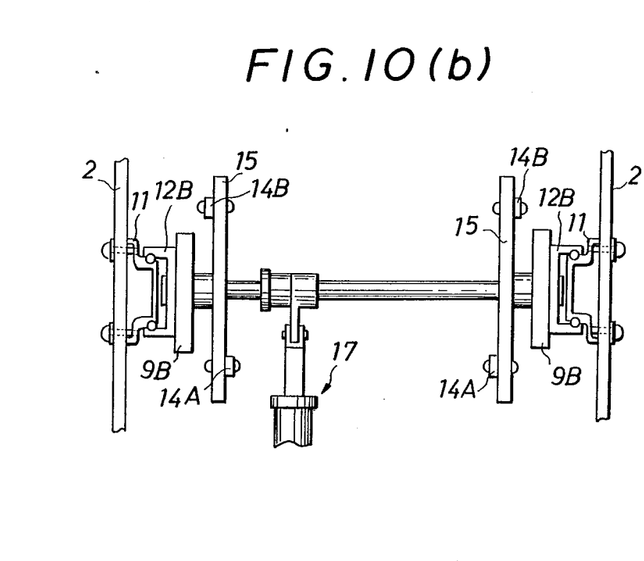

According to this operation of going up and down, the sealing height in which products G are sealed with the unwound folded film is adjusted to the proper height as shown in FIG. 10(a) and (b).

M1 and M2 shown in FIG. 2 are electric motors for driving the infeed conveyor 3 and discharge conveyor 6.

Figure 3:
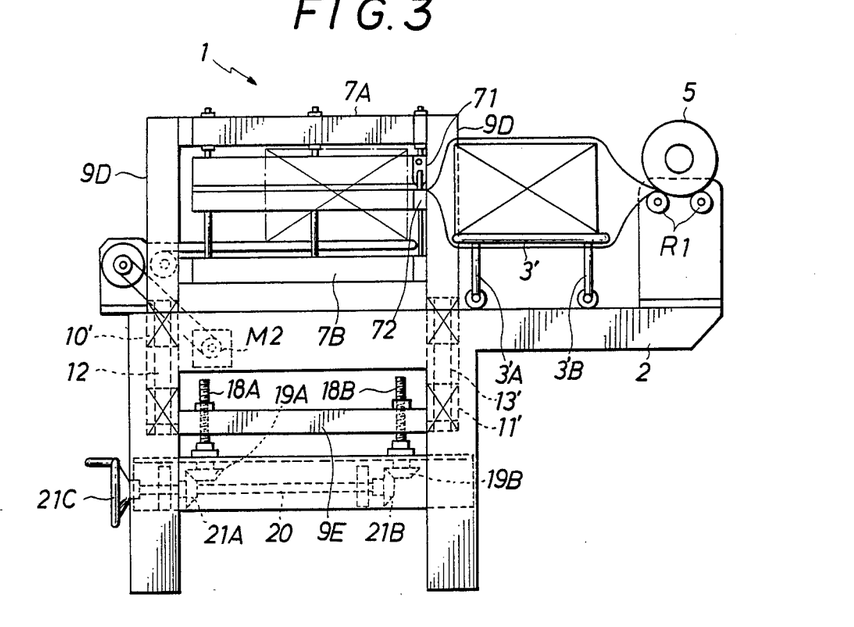
FIG. 3 is a top view showing a different embodiment of an infeed conveyor.

Another embodiment of a package wrapping apparatus according to the invention is shown in FIG. 3 and FIG. 4, in which a table 3' is used instead of the infeed conveyor 3 of the above preferred embodiment, and also the sealing direction of the sealing section 7 in another embodiment is changed to 90 degrees with respect to the direction of the path of travel of packages G.

The table 3' is pivotally mounted on the main frame 2 through two pairs of legs 3'A and 3'B, and the height of the table 3' is adjustable.

The sealing section 7 is supported by side plates 9D, 9D which are equipped with rails 10', 11' mated with the linear ball bearings 10 fixed to the main frame 2 so the sealing section 7 can move up or down along with the 10' and 11' of the one side of the main frame 2 so the sealing section 7 can move up or down along with the 10' and 11' of the one side of the main frame 2.

The rod end of an air cylinder 17' is pivotally mounted on the one end of the upper sealing jaw 7A, and the cylinder end of the air cylinder 17' is pivotally mounted on the bracket of the side plate 7D.

The middle of the upper sealing jaw 7A and the end of the lower sealing jaw 7B are pivotally connected to each other so that 7B is operated in relative to the motion of 7A.

The sealing jaws 7A and 7B are operated to the closed position indicated by phantom lines or the opened position indicated by solid lines as shown in FIG. 4.

And a rectangular base plate 9E is secured between 9D, similar sealing height adjusting means described in the preferred embodiment, and the same symbols for the same constructions are used on this another embodiment and the description above the same constructions is omitted.

In this case the bevel gear shaft 20 is rotated by turning the handle 21C and 18A the jack screws 18A are rotated through the bevel gears 19A meshing with the bevel gears 21A so that the side plate 9D are moved up or down in accordance with the ascent or descent of the plate 9E.

Figure 5:
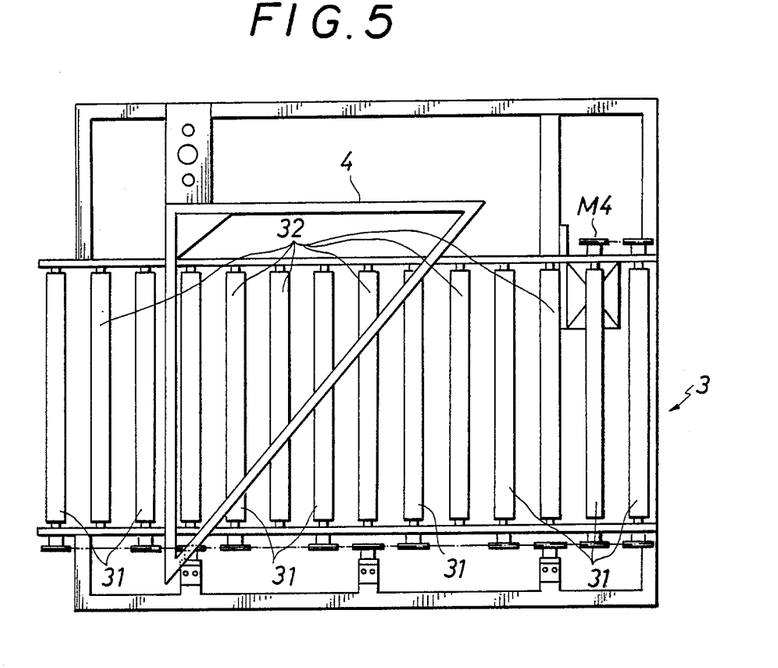
FIG. 5 is an illustration explaining a different embodiment of a discharge conveyor.
Figure 6:
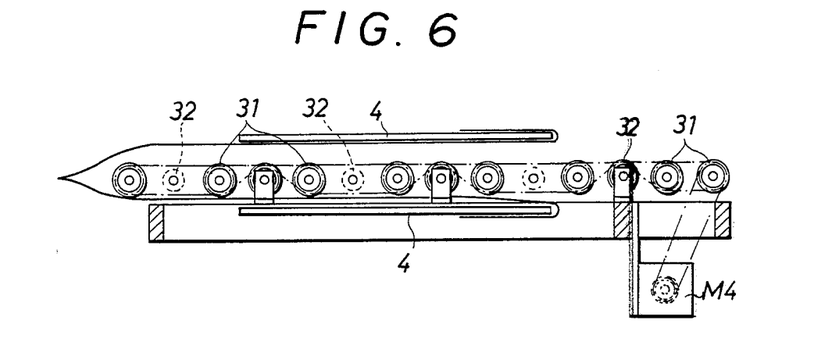
FIG. 6 is a sectional side view corresponding to FIG. 7.

Another embodiment which uses a roller conveyor as infeed conveyor is shown in FIG. 5 and FIG. 6.

31 is a drive roller, and 32 is a following roller, and 34 is a sprocket.

In this embodiment there are advantages in that heavy packages are adequately carried on this roller conveyor.

Another construction of the sealing section 7 and the sealing height adjusting device for this embodiment is not illustrated, since these constructions are the same as those of the above preferred embodiment.

Though the above roller type conveyor is used as an infeed conveyor as shown in FIG. 5 and FIG. 6, it may be used for a discharge conveyor also.

Figure 7A:
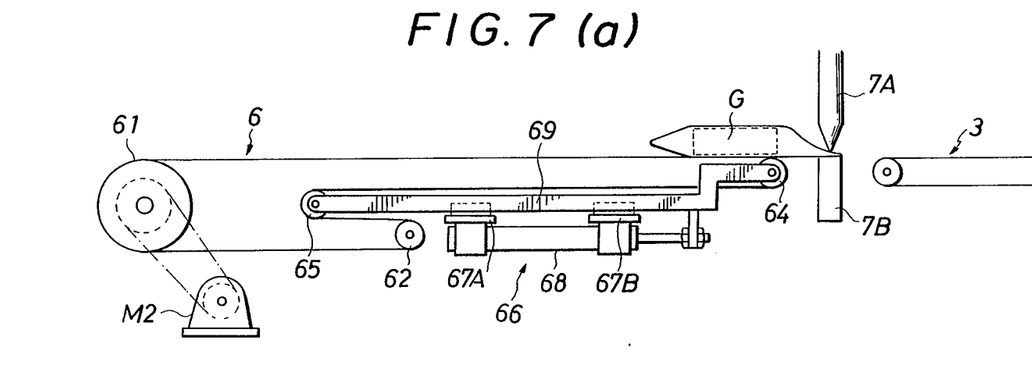
FIG. 7(a) shows a waiting position of it.
Figure 7B:
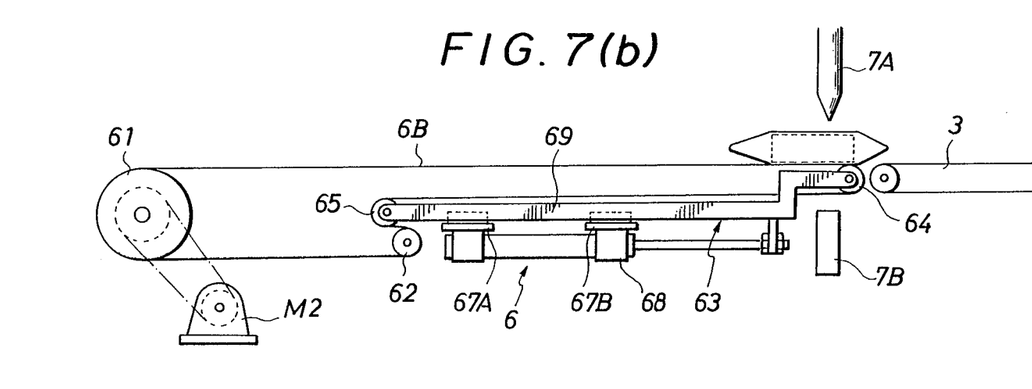
FIG. 7(b) shows a extended position of it.

Another type of conveyor is shown in FIG. 7 as another embodiment of a discharge conveyor.

This illustrated discharge conveyor can extend in the direction of the infeed conveyor to prevent the package carried from the infeed conveyor dropping in the gap between the two conveyors.

That is, this conveyor 6 comprises a fixed belt driving roller 61 and a fixed following roller 62 of which the roller shafts are arranged transversally to the belt traveling direction.

Roller holding frame 63 is provided with rollers 64, 65 pivotally mounted on both its ends, and an endless belt 6B is wound over the stationary belt drive roller 61, movable following rollers 64 and 65, and inverted again at the stationary following roller 62, then returned to the drive roller 61.

Electric motor M2 drives the belt drive roller 61 so that the endless belt 6B travels, and a belt extending and retracting device 66 operates the roller holding frame 63 so that the endless belt 6B is extended or retracted.

Figure 8:
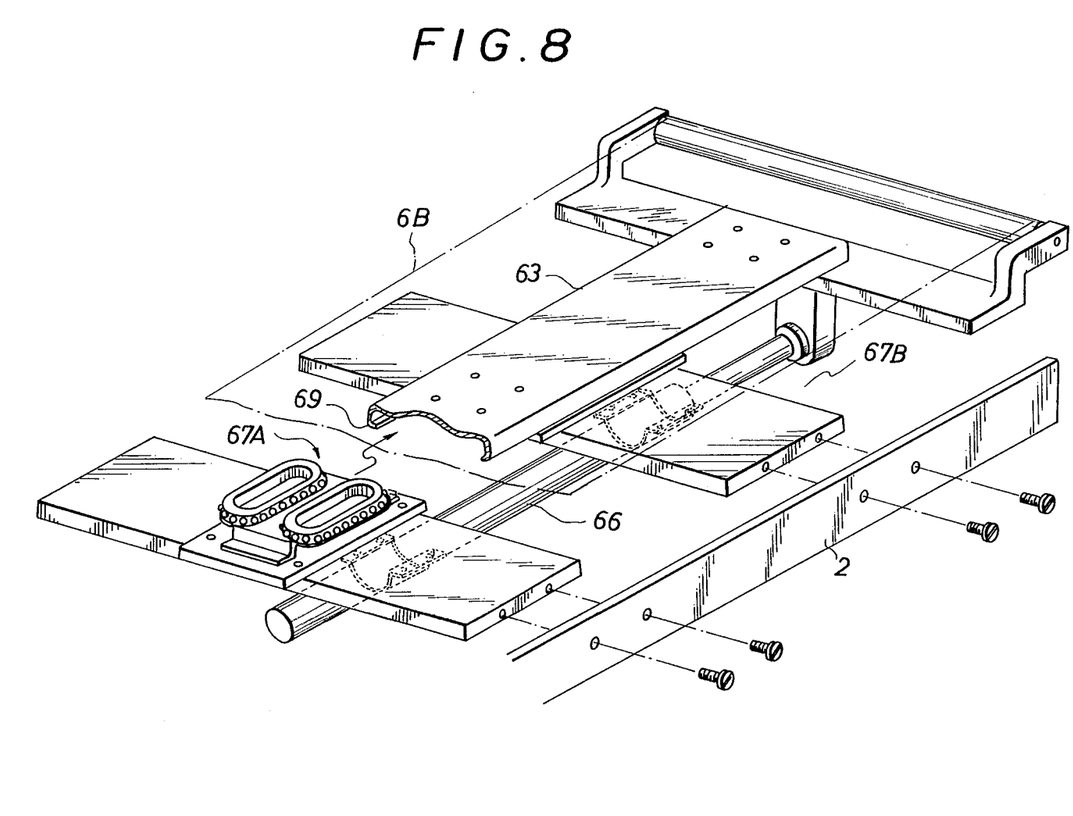
FIG. 8 is a enlarged illustration of a main portion corresponding to FIG. 7.
Figure 9A:
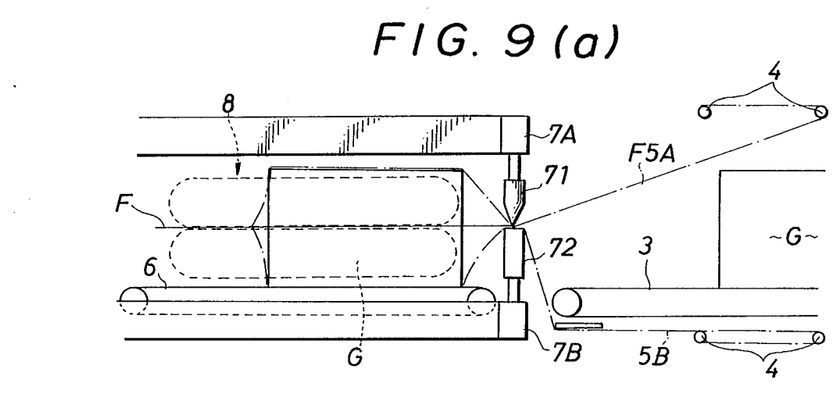
FIG. 9(a) and (b) are illustrations explaining the sealing of different height of products; and, FIGS. 10(a) and 10(b) are drawings showing the installation of linear ball bearings to the main frame.
Figure 9B:
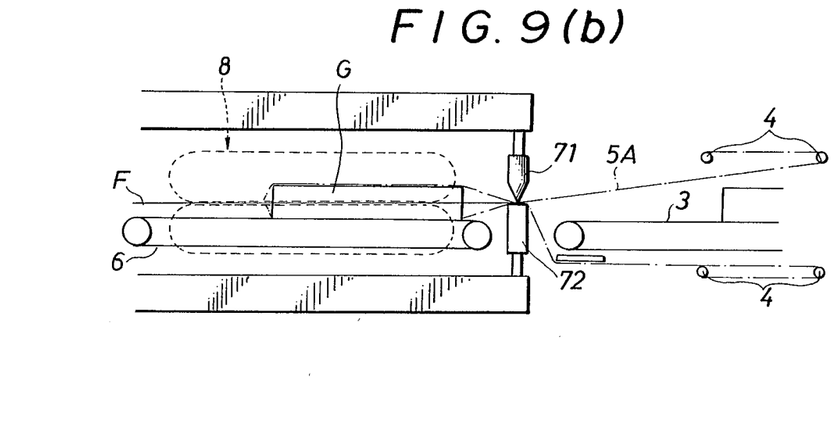

This belt extending and retracting device 66, as shown in FIG. 8, comprises a slide holder 67A, 67B installed on the main frame 2 and an air cylinder 68 installed beneath the slide holder 67A and 67B.

The slide holder 67Z and 67B hold a rail 69 provided on both sides of the roller frame 63 so that it can slide freely along linear ball bearings.

And a rod end of air cylinder 68 is installed on the end of the roller holding frame 63, and the cylinder end is installed on the slide holder 7A, 7B.

According to the above construction of the extending retracting device 66, when the rod of the air cylinder is extended or retracted, the belt conveyor 6 is extended or retracted from the cardinal point of the belt drive roller 61 by the action of the extending and retracting device 63.

So it is not necessary to move the whole conveyor as in the case of prior belt conveyors, and also there is no problem that the article package may be dropped into the gap between two conveyors.

Furthermore, other embodiments of sealing height adjustment, devices may be used; that is the constructions can have a base plate equipped with a gas filled cylinder or an air cylinder, or diamond shaped links mechanism equipped with a horizontal threaded bar screwed into the corresponding opposite link joints of each other, and the base plate can be raised up or lowered by turning the horizontal threaded bar.

What is claimed is:

1. A film wrapping apparatus for wrapping articles in packages of a heat-sealable thermoplastic packaging film comprising, a film-hauling device having traveling clamping runs of upper and lower endless belts for clamping a marginal selvage of a part of a folded strip of said packaging film and advancing it longitudinally, an infeed device for positioning articles successively at a position in which longitudinal superposed parts of the folded packaging film travel respectively over and under the articles for enveloping the articles successively and packaging the articles in corresponding successively formed film packages along a path of travel of the packaging film, a heat-sealing device having an upper and a lower jaw operable to an open position for allowing successive lengths of the folded packaging film to be successively advanced thereinto and operable to a closed position for the jaws effecting heat sealing of the folded packaging film transversely across substantially the entire width along successive lengths of the film and simultaneously severing the corresponding widths of film heat sealed to form successively sealed ends of successive film packages corresponding to successive lengths of the film advanced to define the individual film packages with corresponding articles therein, the jaws having heat-sealing means for sealing in said closed position free sides of overlapping parts of the folded film along the length of the corresponding individual lengths of film defining individual packages and for simultaneously severing the marginal selvage corresponding to the individual lengths of film defining corresponding film packages with articles therein, means for taking up the severed marginal selvage in a roll as received from the film-hauling device, a discharge conveyor for receiving the successive film packages with articles therein after each successive sealing of a leading end of a corresponding film package and discharging successively the completed packages when corresponding trailing ends thereof and heat sealed and severed, and a height adjusting device for raising and lowering the heat-sealing device as a unit to selectively position the jaws thereof in relation to the height of the articles being packages and thereby in relation to the level of the film lengths ends at which a seal is effected to form the individual film packages.

2. A film wrapping apparatus for wrapping articles according to claim 1, in which said infeed device is an infeed conveyor disposed to deliver the packages to the discharge conveyor along said path of travel and is spaced therefrom defining a gap therebetween.

3. In a film wrapping apparatus for wrapping articles in packages of a heat-sealable thermoplastic packaging film, a heat-sealing device having heat-sealing jaws comprising an upper and a lower jaw operable to an open position for allowing successive lengths of overlapping parts of folded packaging film to be successively advanced thereinto for effecting in a closed position sealing of leading and trailing ends of the successive lengths of folded film with an article between the folded parts for effecting packaging thereof, means for cyclically operating the jaws to the open and closed position thereof in timed sequence with advancement of the successive lengths of folded film each with an article therein to be packaged, means for presenting to the heat-sealing device successive lengths of film with respective articles between the folded parts of the film and for presenting them in correspondence with said timed sequence, means for raising and lowering the heat-sealing device as a unit in order to maintain the jaws in desired levels of height in accordance with the path of advancement of the successive lengths of folded film and in dependence upon the height of the articles relative to said path of travel, and means to discharge the packaged articles upon severing of the sealed ends of the lengths of films.

4. In a film wrapping apparatus for wrapping articles in packages of a heat-sealable thermoplastic packaging film in accordance with claim 3, in which said means for raising and lowering the heat-sealing device as a unit comprising manually-operated means for effecting the raising and lowering manually.

5. In a film-wrapping apparatus for wrapping articles in packages of a heat-sealable thermoplastic packaging film in accordance with claim 4, in which said manually operated means comprises a manually rotatable member and a gear system coactive therewith connected to the heat-sealing device.

* * * * *